(12) United States Patent
Schmid

(10) Patent No.: US 7,089,269 B2
(45) Date of Patent: Aug. 8, 2006

(54) SWITCHING BETWEEN CONTAINERS

(75) Inventor: Tommy Richard Schmid, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/660,224

(22) Filed: Sep. 11, 2003

(65) Prior Publication Data

US 2005/0060346 A1   Mar. 17, 2005

(51) Int. Cl.
G06F 17/40 (2006.01)
G06F 17/30 (2006.01)

(52) U.S. Cl. .................... 707/202; 707/204

(58) Field of Classification Search ............ 707/1, 707/100, 104.1, 103 Y, 202, 204; 709/249; 714/21

See application file for complete search history.

(56) References Cited

U.S. PATENT DOCUMENTS

2003/0204479 A1* 10/2003 Bills et al. .................... 707/1

OTHER PUBLICATIONS

Ramzi A. Haraty, C2 Secure Database Management Systems- A Comparative Study, 1998 ACM, pp. 216-220.*

* cited by examiner

Primary Examiner—Apu Mofiz
(74) Attorney, Agent, or Firm—Owen J. Gamon

(57) ABSTRACT

A method, apparatus, system, and signal-bearing medium that in an embodiment determine when to switch between containers based on whether the current fill rate of the container is within a threshold of the slowest fill rate of the container and whether a current size of the container is between a soft threshold and a hard threshold. In this way, the switching of the container is based on a history of how fast the container is filling and how busy the system is in order to diminish the performance effect of switching on the application that is generating data to fill the container.

15 Claims, 6 Drawing Sheets

| | PROFILE DATA | | |
|---|---|---|---|
| | CONTAINER ID 220 | FILL RATE 225 | TIMESTAMP 230 |
| 205 → | CONTAINER A | 1025 | 08:40:00 |
| 210 → | CONTAINER A | 52 | 08:40:30 |
| 215 → | CONTAINER A | 56 | 08:41:00 |

FIG. 2

SWITCHING BETWEEN CONTAINERS

FIELD

This invention generally relates to computers more specifically relates to switching the transfer of data between containers.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. One of the primary uses of computer systems is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

One very important concern in database systems relates to the recovery of data after a problem, such as a power outage or system failure, causes the loss of data. Mechanisms have been developed to log or journal changes to a database so that the database can be reconstructed from the log or journal if data is lost for some reason. These mechanisms are referred to herein as journal mechanisms, realizing that different names may be used to refer to the journaling function.

The database system journals or logs database object changes by sending information that describes the changes to a container, which is often called a journal receiver. Since a database may have many users and processes that can change data in the database, the information describing the object changes can quickly grow to be quite large. Since managing a single and very large journal receiver is unwieldy and cumbersome, database systems often use multiple, smaller, journal receivers and switch to a new journal receiver when the current journal receiver is full.

The database system needs a technique for determining when the journal receiver is full or nearly full. One current technique is to assign the journal receiver a hard threshold, which is an absolute number or size. Once the hard threshold is reached, the database system changes to a new journal receiver. This technique suffers from the problem that when many items are being stored in the journal receiver, the time needed to switch to a new journal receiver will temporarily slow down or even stop the incoming data until the new journal receiver is ready to accept the incoming data.

During this temporary stoppage, all the applications that are initiating the changes to the database that are causing the information to be sent to the journal receiver are also stopped. This temporary stoppage can have a dramatic effect on the users. Using the insurance company example from above, customers who call in wanting to buy insurance or inquire about their policy may experience a delay while the database system switches journal receivers. This delay annoys the customers and may prompt them to take their business elsewhere, causing the insurance company to lose money.

Without a better way to handle the switching of journal receivers, computers will continue to suffer with poor performance, which is annoying and expensive for the users. Although the aforementioned problems have been described in the context of switching journal receivers, they may apply to the switching of any type of container or data repository and to the transfer of any type of data to the container.

SUMMARY

A method, apparatus, system, and signal-bearing medium are provided that in an embodiment determine when to switch between containers based on whether the current fill rate of the container is within a threshold of the slowest fill rate of the container and whether a current size of the container is between a soft threshold and a hard threshold. In this way, the switching of the container is based on a history of how fast the container is filling and how busy the system is in order to diminish the performance effect of switching on the application that is generating data to fill the container.

BRIEF DESCRIPTION OF THE DRAWINGS

FIG. 2 depicts a block diagram of example profile data, according to an embodiment of the invention.

DETAILED DESCRIPTION

In an embodiment, a controller determines when to switch between containers based on whether the current fill rate of the container is within a threshold of the slowest fill rate of the container and whether a current size of the container is in a soft area between a soft threshold and a hard threshold. The controller periodically determines and saves the fill rate of the container. When the current size of the container reaches the soft area, the controller switches containers if the current fill rate is within a threshold of the slowest fill rate of the container. In this way, the switching between containers is based on a history of how fast the container is filling and how busy the system is in order to diminish the performance effect of switching on the application that is generating data to fill the container.

Figure 1:
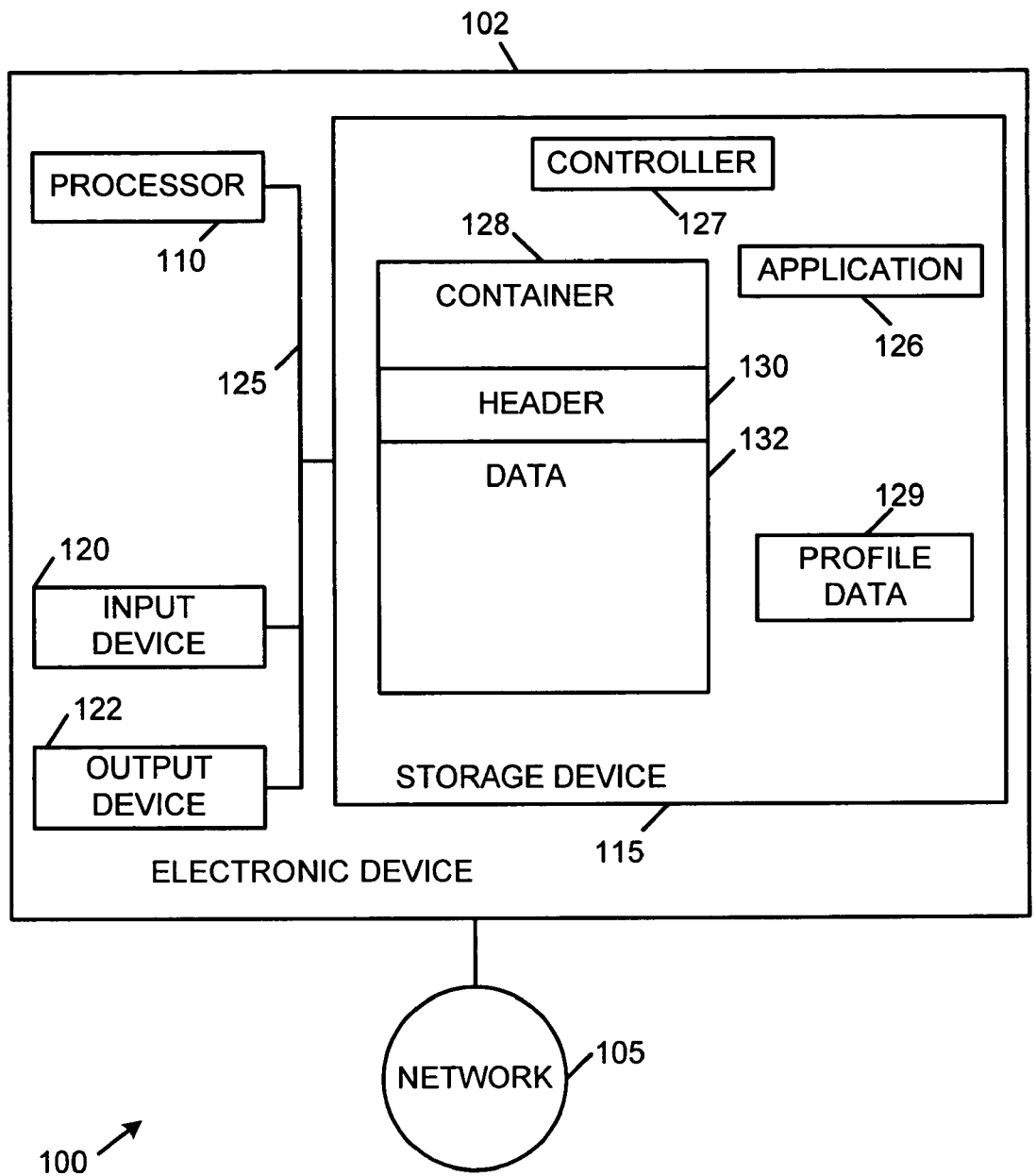
FIG. 1 depicts a block diagram of an example system for implementing an embodiment of the invention.

FIG. 1 depicts a block diagram of an example system 100 for implementing an embodiment of the invention. The system 100 includes a electronic device 102 connected to a network 105. Although only one electronic device 102 and one network 105 are shown, in other embodiments any number or combination of them may be present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, other embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, hard disk media, floppy disk media, tape media, CD (compact disk) media, DVD (digital video disk or digital versatile disk) media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, the storage device 115 may be external to the electronic device 102 and/or may be distributed across other electronic devices, such as devices connected to the network 105.

The storage device 115 includes an application 126, a controller 127, a container 128, and profile data 129. Although the application 126, the controller 127, the container 128, and the profile data 129 are illustrated in FIG. 1 as being included within the storage 115 in the electronic device 102, in other embodiments they may be stored on different storage devices or on different electronic devices and accessed remotely, e.g., via the network 105. Although the application 126 is illustrated as being separate from the controller 127, in another embodiment they may be packaged together.

The application 126 transfers data to the container 128. In an embodiment, the application 126 is a database system that transfers data to the container 128 in order to log or journal changes to a database. But, in other embodiments the application 126 may be any appropriate program or function that transfers data to the container 128.

The controller 127 creates and updates the profile data 129 and determines when to switch between containers (from a current container to a new container) based on the profile data 129. The profile data 129 is further described below with reference to FIG. 2. The container 128 includes a header portion 130 and a data portion 132. In an embodiment, the container 128 is a journal receiver. In another embodiment, the container 128 is a file. In another embodiment the container 128 may be any repository of data that is capable of being switched. The container 128 is further described below with reference to FIG. 3. Although only one container 128 is illustrated in FIG. 1, multiple containers may be present.

In an embodiment, the controller 127 includes instructions capable of executing on the processor 110 or statements capable of being interpreted by instructions executing on the processor 110 to carry out the functions as further described below with reference to FIGS. 4, 5, and 6. In another embodiment, the controller 127 may be implemented either partially or completely in hardware via logic gates and/or other appropriate hardware techniques in lieu of or in addition to a processor-based system.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number (including zero) and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number (including zero) of output devices of different types or of the same type may be present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, client computers, server computers, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In an embodiment, the network 105 may be a network of storage devices, attached directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be a FRS (Family Radio Service) network. In another embodiment, the network 105 may be any appropriate cellular data network or cell-based radio network technology. In another embodiment, the network 105 may be an IEEE 802.11x wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102 and that, when read and executed by one or more processors in the electronic device 102, cause the electronic device 102 to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of the example profile data 129, according to an embodiment of the invention. The profile data 129 includes one or more records, such as records 205, 210, and 215, each record including a container identification field 220, a fill rate field 225, and a timestamp field 230. Although three records 205, 210, and 225 are illustrated, in other embodiments any number of records may be present.

The container identification field 220 identifies the container 128 with which the record is associated. Although each of the records 205, 210 and 215 is illustrated has having a container identification of "Container A," in other embodiments any appropriate container identification may be used and the records may have the same, some of the same, or different container identifications. In another embodiment each container 128 has its own associated profile data 129, and identifying the container within each record is not necessary. The fill rate field 225 indicates the amount of data stored in the container 128 since the previous timestamp. In another embodiment, the fill rate field 225 indicates the rate of data per unit of time stored in the container 128 during time period between the previous timestamp and the current timestamp. The value in the timestamp field 230 indicates the data and/or time at which the record was created and/or the fill rate 225 was determined. The data illustrated in FIG. 2 is exemplary only, and any appropriate data may be present.

Figure 3:
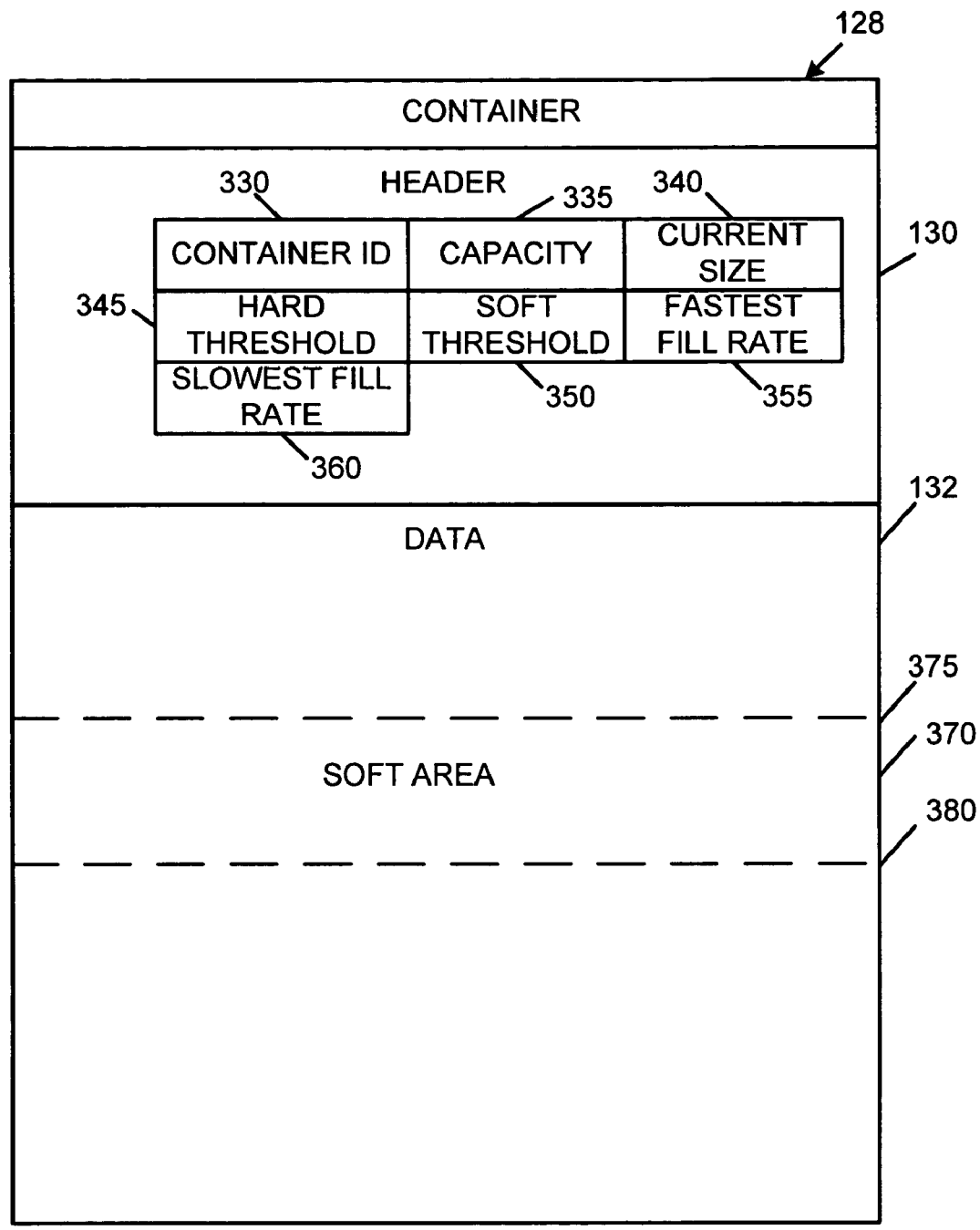
FIG. 3 depicts a block diagram of a container, according to an embodiment of the invention.

FIG. 3 depicts a block diagram of the container 128, according to an embodiment of the invention. The container 128 includes a header portion 130 and data portion 132. The header portion 130 includes a container-identification field 330, a capacity field 335, a current-size field 340, a hard-threshold field 345, a soft-threshold field 350, a fastest-fill-rate field 355, and a slowest-fill-rate field 360.

The container-identification field 330 uniquely identifies the container 128. The capacity field 335 indicates the maximum capacity of the data portion 132 of the container 128. The current-size field 340 indicates the amount of data currently in the data portion 132 of the container 128. The hard-threshold field 345 specifies the upper boundary 375 of the soft area 370 in the data portion 132 of the container 128. In an embodiment, the hard-threshold 345 is the same as the capacity 335, but in another embodiment they are different. When the current-size field 340 reaches the hard-threshold 345, the controller 127 switches the container to a new container regardless of how busy the electronic device 102 is and regardless of the rate at which the application 126 deposits, transfers, or writes data into the container 128. In an embodiment, the hard-threshold 345 is expressed as a percentage of the capacity 335 or other relative number, but in another embodiment, the hard-threshold 345 may be expressed as an absolute value or amount of data.

The soft-threshold field 350 specifies the lower boundary 380 of the soft area 370 in the data portion 132 of the container 128. In an embodiment, the soft-threshold 350 is expressed as a percentage of the capacity 335 or other relative number, but in another embodiment, the soft-threshold 350 may be expressed as an absolute value. The soft-threshold 350 is less than the hard-threshold 345. The use of the soft-threshold 350 is further described below with reference to FIG. 6.

The fastest-fill-rate field 355 specifies the highest value in the fill-rate field 225 for the container 128 during a time period. The slowest-fill-rate field 360 specifies the lowest value in the fill-rate field 225 for the container 128 during a time period. The controller 127 searches the records, e.g., the records 205, 210, and 215 in the profile data 129 to determine the fastest-fill rate 355 and the slowest-fill rate 360, as further described below with reference to FIG. 6.

The data portion 132 includes the soft area 370, which is delineated within the data portion 132 by the upper boundary 375, which is stored within the hard-threshold field 345, and the lower boundary 380, which is stored within the soft-threshold field 350.

Figure 4:
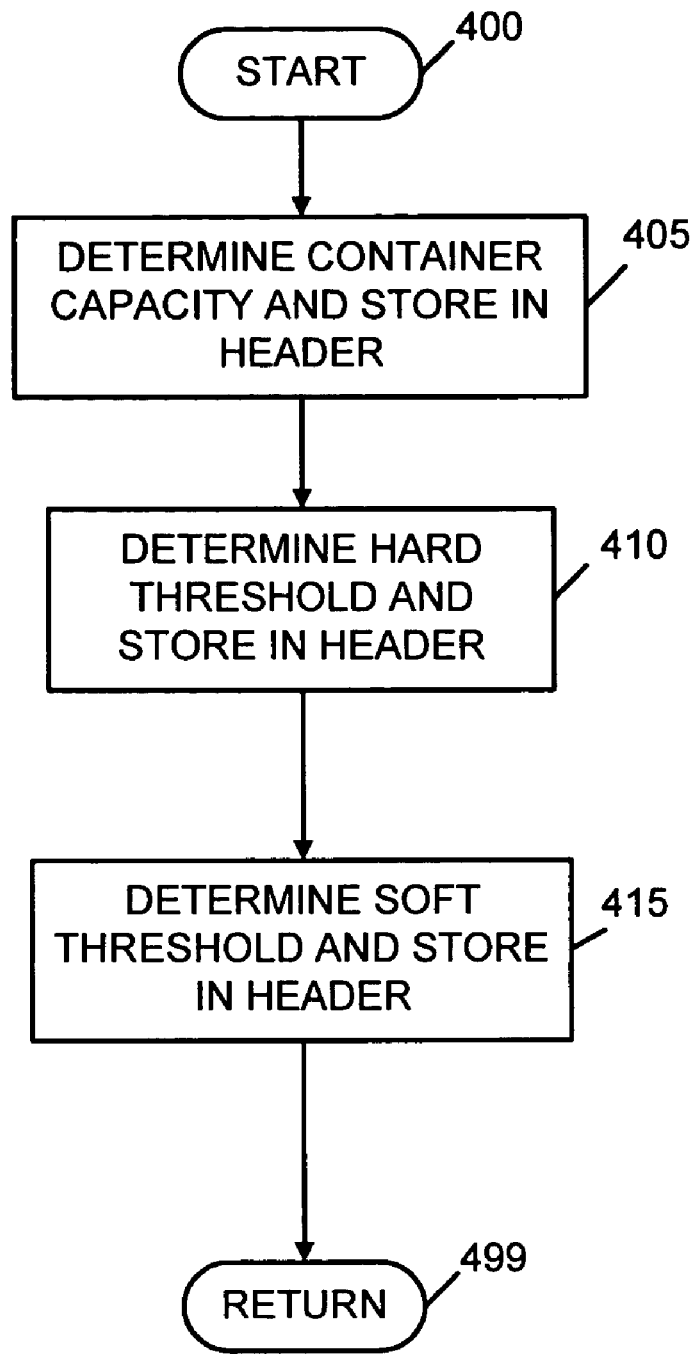
FIG. 4 depicts a flowchart of example processing for initializing a container header via a controller, according to an embodiment of the invention.

FIG. 4 depicts a flowchart of example processing for initializing the container header 130 via the controller 127, according to an embodiment of the invention. Control begins at block 400. Control then continues to block 405 where the controller 127 determines the capacity of the container 128 and stores the capacity in the capacity field 335 in the header portion 130 of the container 128. In an embodiment, the controller 127 determines the capacity of the container 128 from a user. In another embodiment, the controller 127 obtains the capacity of the container 128 from the application 126. In another embodiment, the controller 127 determines the capacity of the container 128 via any appropriate technique.

Control then continues to block 410 where the controller 127 determines the hard threshold value and stores it in the hard-threshold field 345 in the header portion 130 of the container 128. Control then continues to block 415 where the controller 127 determines the soft threshold value and stores it in the soft-threshold field 350 in the header portion 130 of the container 128. In an embodiment, the controller 127 determines the hard threshold 345 and/or the soft threshold 350 from a user. In another embodiment, the controller 127 receives the hard threshold 345 and/or the soft threshold 350 from the application 126. In another embodiment, the controller 127 determines the soft threshold 350 as a percentage of the hard threshold 345. In another embodiment, the controller 127 determines the hard threshold 345 and/or the soft threshold 350 via any appropriate technique or receives the hard threshold 345 and/or the soft threshold 350 from any appropriate source.

Control then continues to block 499 where the logic of FIG. 4 returns.

Figure 5:
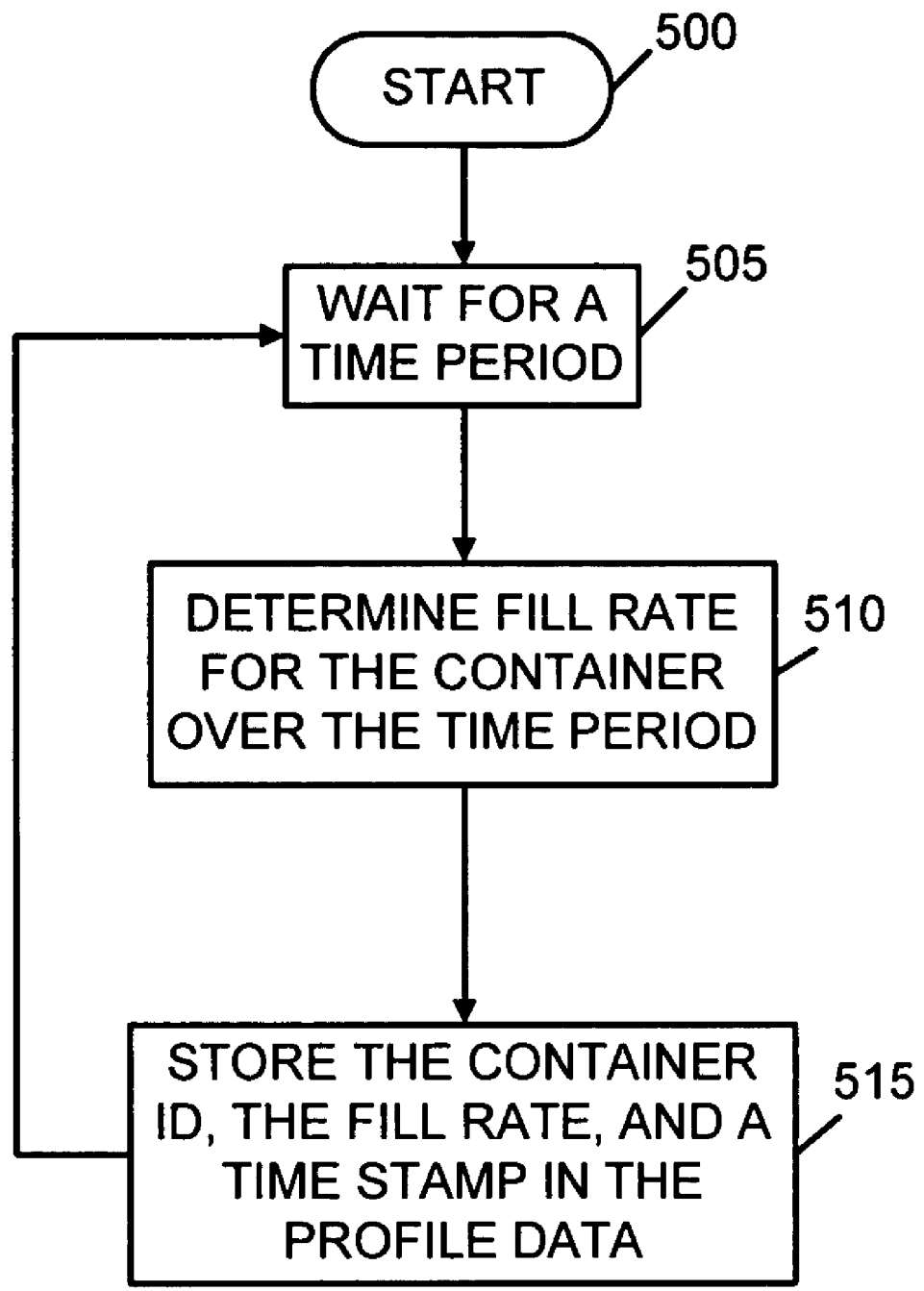
FIG. 5 depicts a flowchart of example processing for periodically determining a fill rate of a container via a controller, according to an embodiment of the invention.

FIG. 5 depicts a flowchart of example processing for periodically determining a fill rate 225 of the container 128 via the controller 127, according to an embodiment of the invention. Control begins at block 500. Control then continues to block 505 where the controller 127 waits for a period of time. In an embodiment the period of time is thirty seconds, but in another embodiments any appropriate period of time may be used. Control then continues to block 510 where the controller 127 determines a fill rate for data entering the container 128 over the time period for which the controller 127 previously waited at block 505. Control then continues to block 515 where the controller 127 stores the container identification, the fill rate, and the current timestamp in the container-identification field 220, the fill-rate field 225, and the time-stamp field 230, respectively. Control then returns to block 505, as previously described above.

Figure 6:
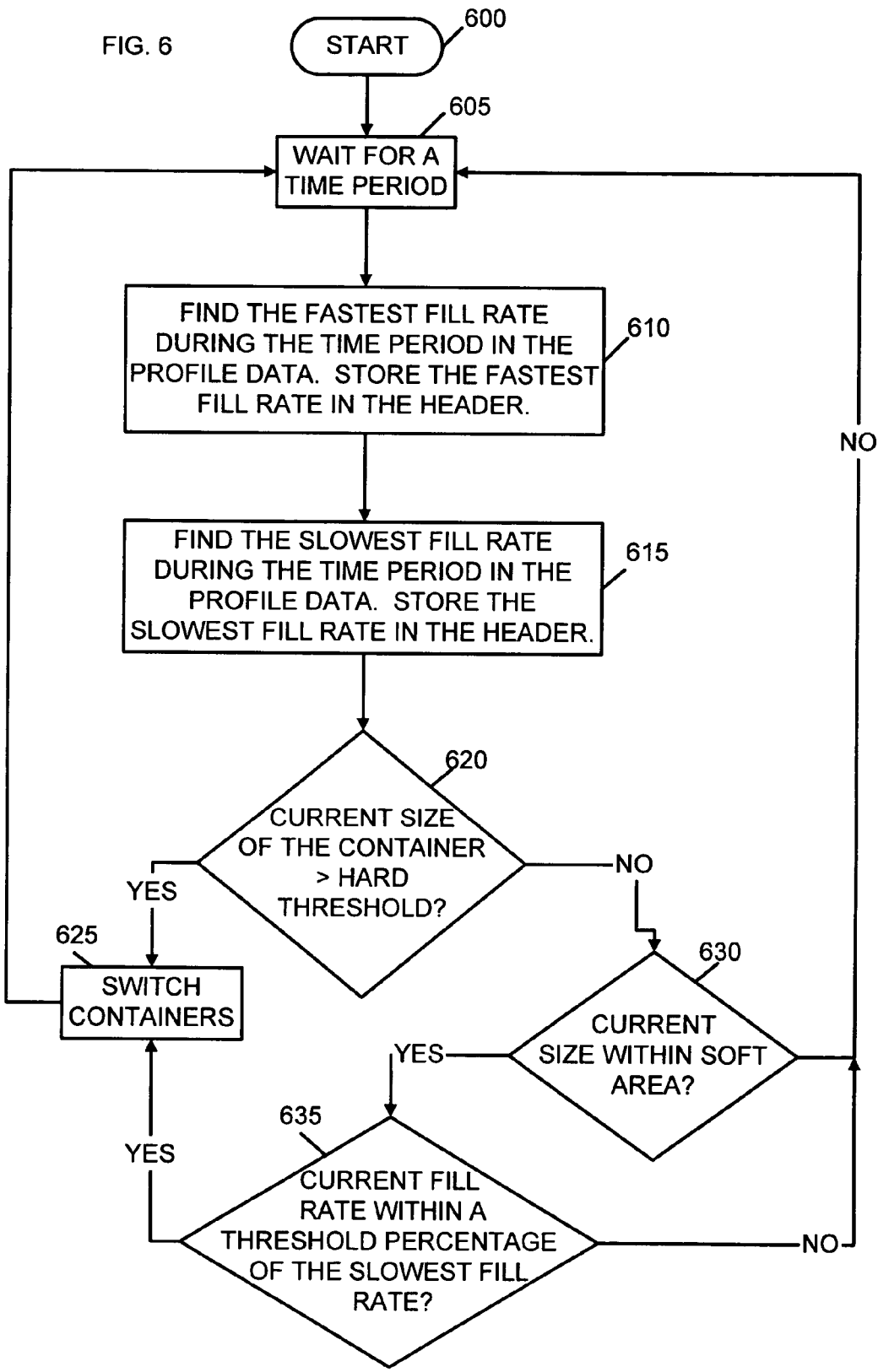
FIG. 6 depicts a flowchart of example processing for periodically determining when to switch the transfer of data between containers via a controller, according to an embodiment of the invention.

FIG. 6 depicts a flowchart of example processing for periodically determining when to switch the transfer of data between containers via the controller 127, according to an embodiment of the invention. Control begins at block 600. Control then continues to block 605 where the controller 127 waits for a period of time. In an embodiment, the period of time is ten minutes. In an embodiment, the time period for which the controller 127 waits at block 605 is greater than the time period for which the controller waits at block 505, but in other embodiments any appropriate time period may be used.

Control then continues to block 610 where the controller 127 finds the fastest-fill rate for the container 128 during the time period from among the records in the profile data 129 by examining the fill-rate field 225 and stores the found fastest-fill-rate value in the fastest-fill-rate field 355 in the header 130 of the container 128. Using the example of FIG. 2, if the current time is 8:50:30 and the time period is ten minutes, then the fastest-fill-rate value in the profile data 128 is "56," which is found in the record 215.

Control then continues to block 615 where the controller finds the slowest-fill-rate for the container 128 during the time period from among the records in the profile data 129 by examining the fill-rate field 225 and stores the found slowest-fill-rate value in the slowest-fill-rate field 360 in the header 130 of the container 128. Using the example of FIG. 2, if the current time is 8:50:30 and the time period is ten minutes, then the slowest-fill-rate value in the profile data 128 is "52," which is found in the record 210.

Control then continues to block 620 where the controller 127 determines whether the current size 340 of the container 128 is greater than the hard threshold 345. If the determination at bock 620 is true, then control continues to block 625 where the controller 127 switches containers from the current container to a new container, so that the new container is now ready to receive data from the application 126. Control then returns to block 605 as previously described above.

If the determination at block 620 is false, then control continues to block 630 where the controller 127 determines whether the current size 340 of the container 128 is within the soft area 370, i.e., the controller 127 determines whether the current size 340 is greater than the soft threshold 350 and less than the hard threshold 345. If the determination at block 630 is false, then the current size 340 is not within the soft area 370, so control returns to block 605, as previously described above.

If the determination at block 630 is true, then the current size 340 is within the soft area 370, so control continues to block 635 where the controller 127 determines whether the current fill rate (the rate that data is currently flowing into the container 128 from the application 126) is within a fill-rate threshold of the slowest fill rate. In an embodiment, the controller 127 receives the fill-rate threshold from the application 126, but in other embodiments, the controller 127 receives the fill-rate threshold from a user or from any other appropriate source. In an embodiment the fill-rate threshold is expressed as a percentage or a relative value, but in another embodiment the fill-rate threshold may be an absolute value. If the determination at block 635 is true, then control continues to block 625 where the controller 127 switches containers from a current container to a new container, so that the application 126 now fills the new container with data, as previously described above.

If the determination at block 635 is false, then control returns to block 605 as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A computer-implemented method comprising:
   determining whether a current fill rate of a container is within a threshold of a slowest fill rate of the container; and
   when the determining is true, switching from the container to a new container, wherein the switching further comprises switching journaling of changes to a database from the container to the new container.

2. The method of claim 1, further comprising:
   determining the slowest fill rate from a plurality of fill rates for the container over a plurality of time periods.

3. The method of claim 2, further comprising:
   periodically determining each of the plurality of fill rates.

4. An apparatus comprising:
   means for calculating a plurality of fill rates of a container for a respective plurality of time periods;
   means for calculating a slowest fill rate of the plurality of fill rates;
   means for determining whether a current fill rate of the container is within a fill-rate threshold of the slowest fill rate; and
   means for switching an application from filling the container to filling a new container when the means for determining is true, wherein the means for switching further comprises means for switching journaling of changes to a database from the container to the new container.

5. The apparatus of claim 4, wherein the means for determining further comprises:
   means for determining whether a current size of the container is between a soft threshold and a hard threshold.

6. The apparatus of claim 4, further comprising:
   means for switching an application from filling the container to filling the new container when a current size of the container exceeds a hard threshold.

7. A computer-readable storage medium encoded with instructions, wherein the instructions when executed comprise:
   calculating a plurality of fill rates of a container for a respective plurality of time periods;
   calculating a slowest fill rate of at least a portion of the plurality of fill rates;
   determining whether a current fill rate of the container is within a fill-rate threshold of the slowest fill rate and whether a current size of the container is between a soft threshold and a hard threshold; and
   switching an application from filling the container to filling a new container when the determining is true, wherein the switching further comprises switching journaling of changes to a database from the container to the new container.

8. The computer-readable storage medium of claim 7, further comprising:
   switching the application from filling the container to filling the new container when the current size of the container exceeds the hard threshold.

9. The computer-readable storage medium of claim 7, further comprising:
   refraining from switching the application from filling the container to filling the new container when the determining is false.

10. The computer-readable storage medium of claim 7, further comprising:
    receiving the fill-rate threshold from the application.

11. A electronic device comprising:
    a processor; and
    a storage device encoded with instructions, wherein the instructions when executed on the processor comprise:
      calculating a plurality of fill rates of a first container for a respective plurality of time periods,
      calculating a slowest fill rate of at least a portion of the plurality of fill rates,
      determining whether a current fill rate of the first container is within a fill-rate threshold of the slowest fill rate and whether a current size of the first container is between a soft threshold and a hard threshold, and
      switching an application from filling the first container to filling a second container when the determining is true, wherein the switching further comprises switching journaling of changes to a database from the first container to the second container.

12. The electronic device of claim 11, wherein the instructions further comprise:
    deciding whether a current size of the first container exceeds the hard threshold.

13. The electronic device of claim 12, wherein the instructions further comprise:
    switching the application from filling the first container to filling the second container when the deciding is true.

14. The electronic device of claim 11, wherein the instructions further comprise:
    receiving the fill-rate threshold from the application.

15. The electronic device of claim 11, wherein the instructions further comprise:
    receiving the hard threshold and the soft threshold from the application.

* * * * *